United States Patent [19]

Yamakawa et al.

[11] Patent Number: 4,576,061

[45] Date of Patent: Mar. 18, 1986

[54] SYSTEM FOR CONTROLLING THE TRANSMISSION OF A FOUR-WHEEL DRIVE VEHICLE

[75] Inventors: Toru Yamakawa; Fujio Makita, both of Hachioji; Mitsuo Umezawa; Ryuzo Sakakiyama, both of Tokyo, all of Japan

[73] Assignee: Fuji Jukogyo Kabushiki Kaisha, Tokyo, Japan

[21] Appl. No.: 561,719

[22] Filed: Dec. 15, 1983

[30] Foreign Application Priority Data

Dec. 16, 1982 [JP] Japan .................................. 57-221347

[51] Int. Cl.⁴ .............................................. F16H 37/06
[52] U.S. Cl. .............................. 74/665 T; 74/665 GA; 74/861
[58] Field of Search ............. 180/233, 247; 74/665 G, 74/665 GA, 665 T, 710.5, 861, 865, 866; 364/426, 431.07

[56] References Cited

U.S. PATENT DOCUMENTS

| | | | |
|---|---|---|---|
| 4,298,085 | 11/1981 | Moroto et al. | 180/247 |
| 4,367,661 | 1/1983 | Moroto et al. | 74/665 GE |
| 4,387,795 | 6/1983 | Mueller | 74/665 T X |
| 4,407,387 | 10/1983 | Lindbert | 180/247 |
| 4,417,641 | 11/1983 | Kageyama | 180/247 |
| 4,433,748 | 2/1984 | Satoh et al. | 180/247 |
| 4,466,502 | 8/1984 | Sakai | 180/247 |

Primary Examiner—Willaim F. Pate, III
Assistant Examiner—Dwight G. Diehl
Attorney, Agent, or Firm—Martin A. Farber

[57] ABSTRACT

A system for controlling a power transmission of a four-wheel drive vehicle powered by an engine. The system is provided with a transmission for transmitting a power of the engine to main wheels, a clutch for selectively transmitting the power to auxiliary wheels, a vehicle speed sensor for sensing the speed of the vehicle and for producing a vehicle speed signal dependent on the speed, a steering angle sensor for sensing the steering angle of the vehicle and for producing a steering angle signal dependent on the steering angle. A control circuit is provided to compare the vehicle speed signal and steering angle signal with reference values and judge whether the condition is in the range of conditions causing tight corner braking and to produce a clutch signal. A switch is responsive to the clutch signal for disengaging the clutch, whereby the four-wheel drive is changed to the two-wheel drive.

6 Claims, 5 Drawing Figures

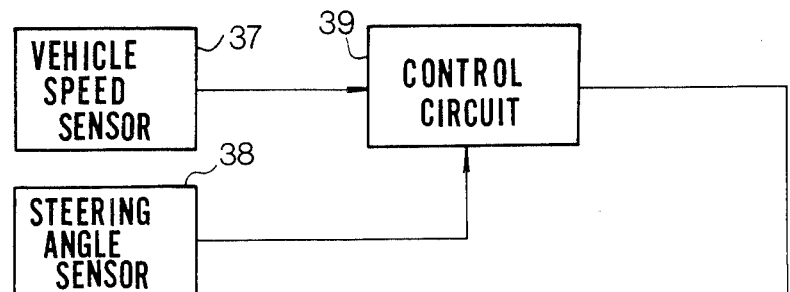
FIG. 2
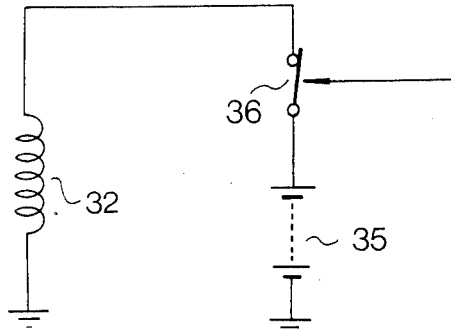
FIG. 4
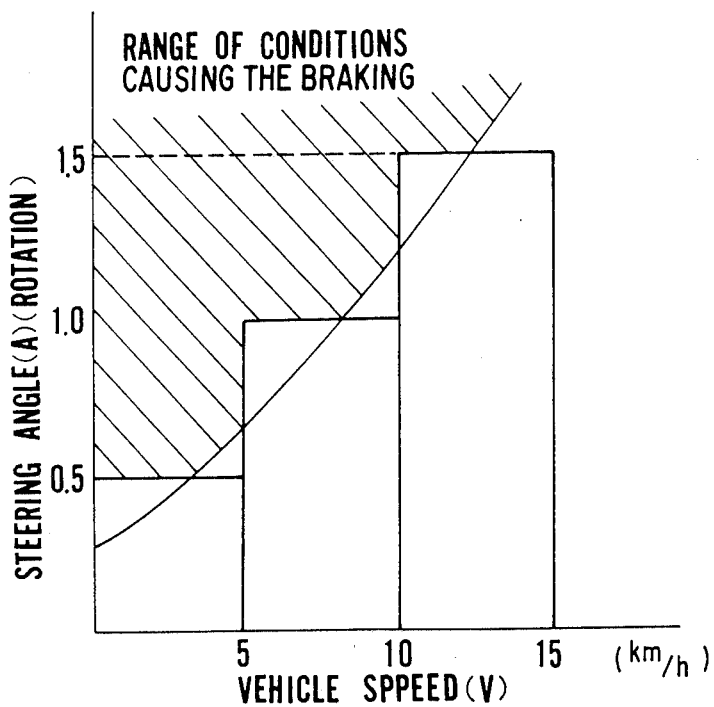

SYSTEM FOR CONTROLLING THE TRANSMISSION OF A FOUR-WHEEL DRIVE VEHICLE

BACKGROUND OF THE INVENTION

The present invention relates to a system for a four-wheel drive vehicle for automatically changing the transmission system from four-wheel drive to two-wheel drive.

During driving of a four-wheel drive vehicle, tire scraping occurs because of slight differences in effective wheel radii resulting from inevitable differences in tire inflation, tread wear or variation in loading. In addition, when the vehicle negotiates corners, braking phenomenon called "tight corner braking" may occur during sharp cornering. This is caused by the front wheels running through an arc of greater radius than that of the rear wheels and therefore tending to rotate faster than the rear wheels. This will result in increase of tire wear and fuel consumption and decrease of driveability.

In order to eliminate such disadvantages, a four-wheel drive vehicle provided with a friction clutch system having a variable transmission torque has been proposed. Generally the transmission torque is controlled in dependency on the steering angle, allowing slipping to occur in the friction clutch to prevent the tight corner braking. However, the steering angle at which the tight corner braking phenomenon occurs is not a constant value, but varies with the vehicle speed. If the vehicle speed is low, the tight corner braking occurs at a small steering angle. Therefore, the conventional system in which the changing of four-wheel drive to two-wheel drive is carried out at a constant steering angle can not prevent the tight corner braking at low vehicle speed.

SUMMARY OF THE INVENTION

An object of the present invention is to provide a system which may automatically change the four-wheel drive to two-wheel drive in the entire vehicle speed range.

According to the present invention, there is provided a system for controlling a power transmission of a four-wheel drive vehicle powered by an engine comprising: a transmission for transmitting a power of said engine to main wheels; a clutch for selectively transmitting said power to auxiliary wheels; first sensing means for sensing the speed of the vehicle and for producing a vehicle speed signal dependent on the speed; second sensing means for sensing the steering angle of the vehicle and for producing a steering angle signal dependent on the steering angle; means responsive to said vehicle speed and steering angle signals for producing a clutch signal to engage said clutch under conditions decided by the vehicle speed and steering angle; and switch means responsive to said clutch signal for disengaging said clutch, whereby the four-wheel drive system is changed to the two-wheel drive system.

The present invention is illustrated by the following description of an example of a control system in accordance therewith, reference being made to the accompanying drawings.

BRIEF DESCRIPTION OF DRAWINGS

FIG. 2 is a block diagram of a control system of the present invention;

FIG. 4 is a graph showing the relationship between steering angle and vehicle speed with respect to tight corner braking.

DETAILED DESCRIPTION OF THE PREFERRED EMBODIMENT

Figure 1:
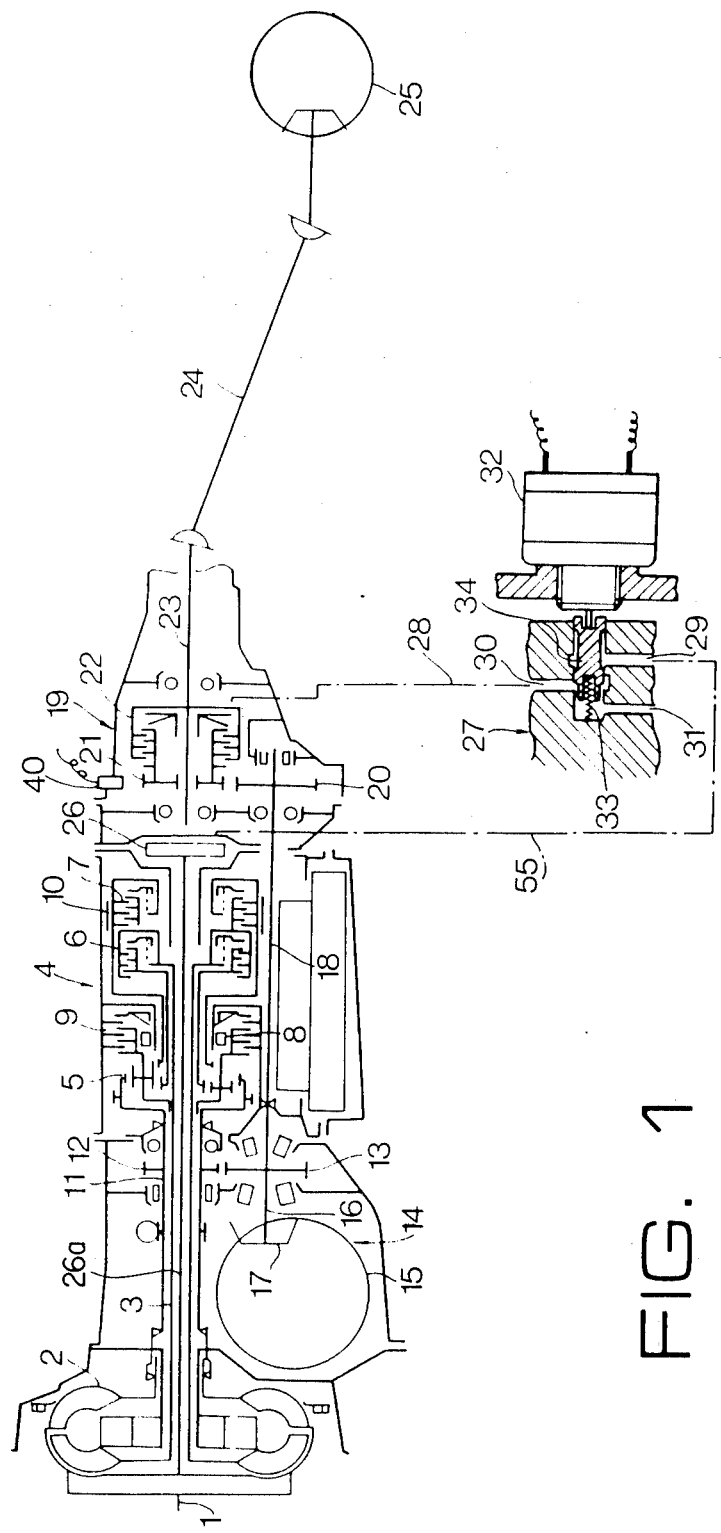
FIG. 1 is a schematic view showing a transmission system used in conjunction with the control system of the present invention.

Referring to FIG. 1, a crankshaft 1 of an engine (not shown) mounted on a vehicle is operatively connected to a turbine shaft 3 through a torque converter 2. The turbine shaft 3 is operatively connected to an automatic transmission device 4.

The automatic transmission device 4 comprises a planetary gear 5, clutches 6 and 7, a one-way clutch 8, a brake 9, and a brake band 10.

The output of the automatic transmission device is transmitted to an output shaft 11 on which a gear 12 is securely mounted and which in turn engages with a gear 13. The gear 13 is integral with a shaft 16 of a drive pinion 17 which engages with a crown gear 15 of a final reduction device 14 for front wheels of the vehicle. The shaft 16 is connected to a transfer drive shaft 18 which extends rearwardly and is connected to a first transfer gear 20 of a transfer device 19. The first transfer gear 20 is operatively connected to a hydraulic clutch 22 through a second transfer gear 21. The hydraulic clutch 22 is adapted to be engaged by pressure oil supplied by an oil pump 26. The driven member of the hydraulic clutch 22 is operatively connected to a final reduction device 25 for rear wheels through a rear drive shaft 23 and a propeller shaft 24.

A pressure oil control system has an electromagnetic changeover valve 27. The valve 27 comprises a spool 34 connected to a rod of a solenoid 32, a spring 33 to bias the spool 34 to the right, an inlet port 29, an outlet port 30, and a drain port 31. The inlet port 29 is communicated with the oil pump 26 in the automatic transmission device 4 through a passage 55 and the outlet port 30 is communicated with the hydraulic clutch 22 by a passage 28 for engagement of the clutch. The oil pump 26 is connected to a drive member of the torque converter 2 by a central oil pump driving shaft 26a extending in the turbine shaft 3.

In the de-energized state of the solenoid 32, which is the illustrated state, the inlet port 29 is closed and the outlet port 30 is communicated with the drain port 31. Thus, the hydraulic clutch 22 is disengaged. When the solenoid 32 is energized, the spool 34 is shifted to the left, so that the drain port 31 is closed and the inlet port 29 is communicated with the outlet port 30 to engage the hydraulic clutch 22, thereby establishing the four-wheel drive system.

Referring to FIG. 2, an electrically operated switch 36 is connected between the solenoid 32 and a battery 35 in series. Thus, the solenoid 32 is energized by closing the switch 36 to establish the four-wheel drive.

In order to detect driving conditions of the vehicle, a vehicle speed sensor 37 and a steering angle sensor 38 are provided. The sensor 37 produces output pulses dependent on vehicle speed. Output signals of these sensors are applied to a control circuit 39. The control circuit 39 operates to detect conditions causing the tight corner braking. When the condition of tight corner braking is detected, the control circuit 39 produces an output signal which is applied to the switch 36 to open it. Thus, the solenoid 32 is de-energized to disengage the hydraulic clutch 22, so that the four-wheel drive is changed to the two-wheel drive.

Figure 3:
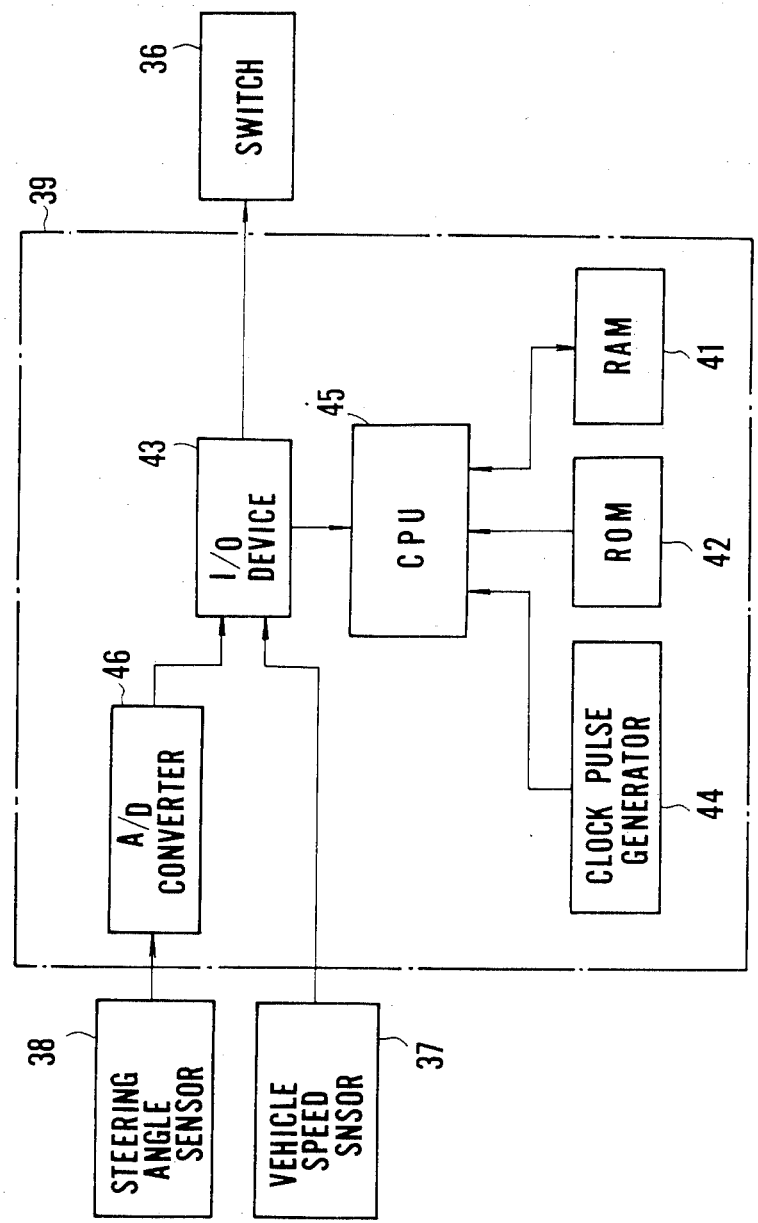
FIG. 3 is a block diagram showing an example of a control circuit of FIG. 2.

Referring to FIG. 3, the control circuit 39 is provided with an I/O device 43 for reading input data and operating the switch 36, a ram 41 for storing calculation results, a ROM 42 storing programs and reference values, an A/D converter 46 for converting the output of the steering angle sensor 38 to digital signal, a clock pulse generator 44, and a central processing unit (CPU) 45 for performing a program.

As shown in FIG. 4, the range of conditions causing the tight corner braking becomes low as the vehicle speed decreases, that is the tight corner braking occurs at a small steering angle at a low vehicle speed.

Figure 5:
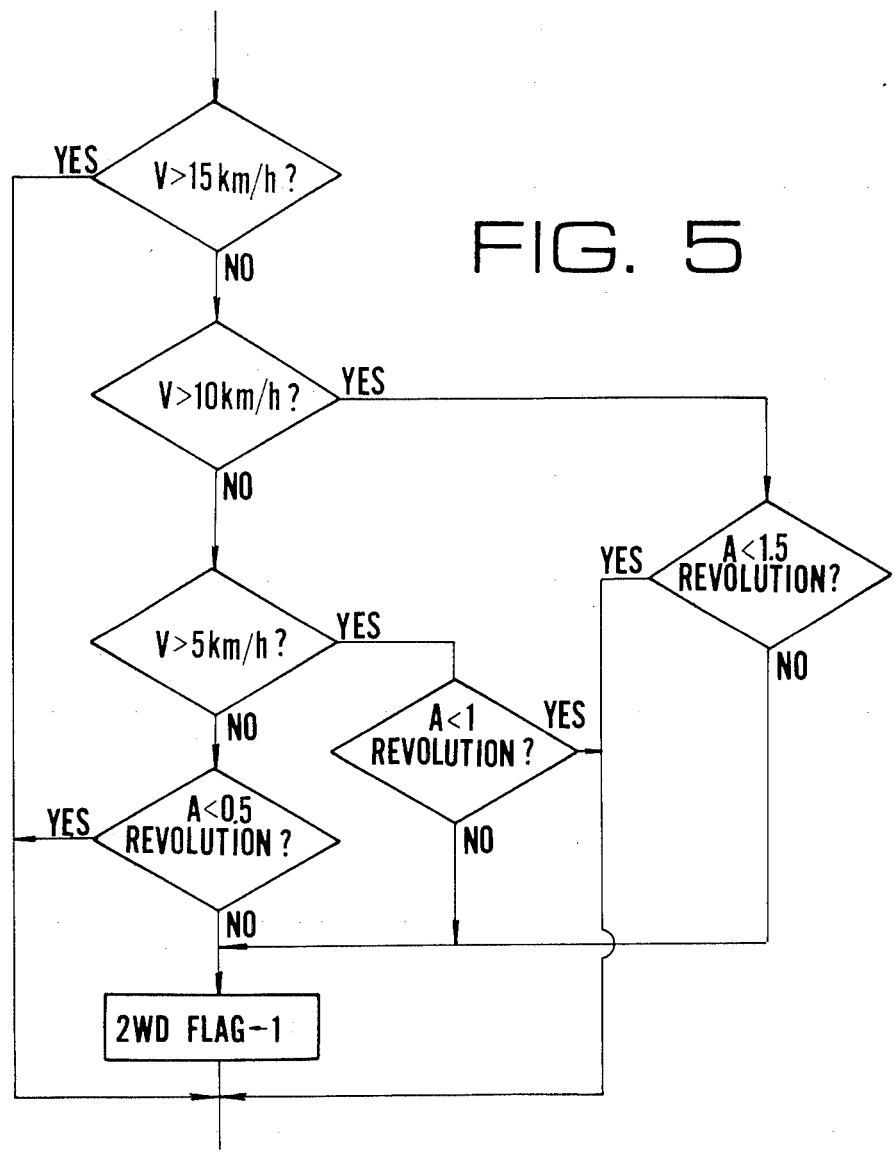
FIG. 5 shows a flow-chart.

Explaining the operation of the system with reference to FIG. 5 showing a flow chart, vehicle speed is divided into four steps, that is between 0 and 5 (km/h), 5-10, 10-15, and over 15 km/h.

The control circuit 39 operates to compare the vehicle speed and the steering angle with reference values stored in the ROM 42 and judges whether the condition is in the range of conditions causing the braking.

When the vehicle speed (v) is higher than 15 km/h and/or the steering angle (A), that is the angle of the steering wheel is lower than 0.5 revolution, the switch 36 is closed to establish the four-wheel drive. When the vehicle speed is between 15 km/h and 10 km/h and the steering angle is larger than 1.5 revolution, two-wheel drive flag becomes a 1. Thus, the switch 36 is opened to disengage the clutch 22, so that the four-wheel drive changes to the two-wheel drive. When the vehicle speed is between 10 and 5 km/h and the steering angle is larger than 1 revolution, the two-wheel drive is established. When the vehicle speed is lower than 5 km/h and the steering angle is larger than 0.5 revolution, the two-wheel drive is provided.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for controlling power transmission of a four-wheel drive vehicle powered by an engine comprising:
    a transmission for transmitting power of said engine to main wheels of the vehicle;
    a clutch for selectively transmitting said power to auxiliary wheels of the vehicle, whereby said main and auxiliary wheels are power driven;
    first sensing means for sensing the speed of the vehicle and for producing vehicle speed signals as a function of the speed;
    second sensing means for sensing the steering angle of the vehicle and for producing steering angle signals as a function of the steering angle;
    control means responsive to said vehicle speed and steering angle signals for producing a clutch signal as a function of the vehicle speed and steering angle such that when the vehicle speed is low, said clutch signal is produced at a first steering angle, and as the vehicle speed increases, the steering angle for said clutch signal increases; and
    switch means responsive to said clutch signal for disengaging said clutch, whereby the four-wheel drive is changed to the two-wheel drive.

2. The system according to claim 1, wherein said clutch is a hydraulic clutch.

3. The system according to claim 1 wherein said control means includes means for comparing signals from said first and second sensing means with reference values.

4. The system according to claim 2 wherein
    said switch means comprises an electromagnetic changeover valve,
    a solenoid means for operating said changeover valve, and
    a switch means responsive to said clutch signal for de-energizing said solenoid.

5. A system for controlling power transmission of a four-wheel drive vehicle powered by an engine comprising:
    a transmission for transmitting power of said engine to main wheels of the vehicle;
    a switching means for selectively transmitting said power to auxiliary wheels of the vehicle, whereby said main and auxiliary wheels are power driven;
    first sensing means for sensing the speed of the vehicle and for producing vehicle speed signals as a function of the speed;
    second sensing means for sensing the steering angle of the vehicle and for producing steering angle signals as a function of the steering angle;
    control means responsive to said vehicle speed and steering angle signals to produce a switching means signal to disengage said switching means from transmitting power to the auxiliary wheels so as to drive the vehicle only with the main wheels in dependency on a variable function of both steering angle and vehicle speed.

6. The system as set forth in claim 5, wherein
    said control means and said variable function further are for engaging said switching means so as to transmit power to the auxiliary wheels so as to drive the vehicle with the main wheels and the auxiliary wheels in ranges when the vehicle speed is greater than a predetermined value and/or the steering angle is lower than a predetermined value and in the remaining range for disengaging said switching means from transmitting power to the auxiliary wheels so as to drive the vehicle with only the main wheels such that the lower the vehicle speed the lower the steering angle above the latter the switching means disengages the power to the auxiliary wheels.

* * * * *